Jan. 15, 1963 F. D. GREENLEAF ET AL 3,074,019

PULSE SEPARATOR AND REPETITION-RATE DISCRIMINATOR

Filed May 26, 1958 2 Sheets-Sheet 1

INVENTORS
FRANCIS D. GREENLEAF
RONALD F. MEYER
BY
Mitchell & Bechert
ATTORNEYS

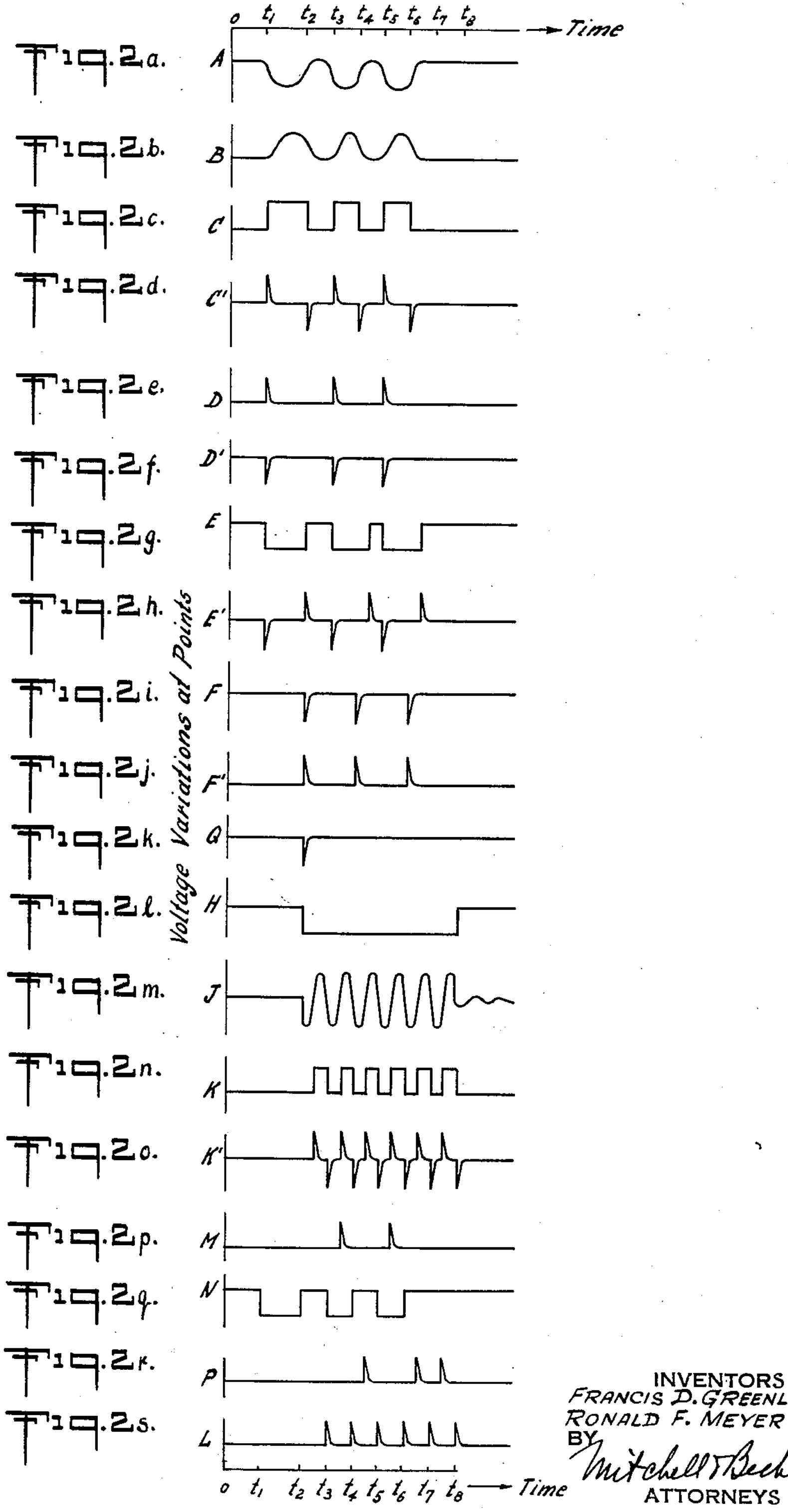
Fig. 2a. Fig. 2b. Fig. 2c. Fig. 2d. Fig. 2e. Fig. 2f. Fig. 2g. Fig. 2h. Fig. 2i. Fig. 2j. Fig. 2k. Fig. 2l. Fig. 2m. Fig. 2n. Fig. 2o. Fig. 2p. Fig. 2q. Fig. 2r. Fig. 2s.
INVENTORS
FRANCIS D. GREENLEAF
RONALD F. MEYER
BY Mitchell & Bechert
ATTORNEYS United States Patent Office 3,074,019
Patented Jan. 15, 1963

3,074,019
PULSE SEPARATOR AND REPETITION-RATE DISCRIMINATOR

Francis D. Greenleaf, Syosset, and Ronald F. Meyer, New York, N.Y., assignors to Servo Corporation of America, New Hyde Park, N.Y., a corporation of New York
Filed May 26, 1958, Ser. No. 737,799
10 Claims. (Cl. 328—110)

Figure 1:
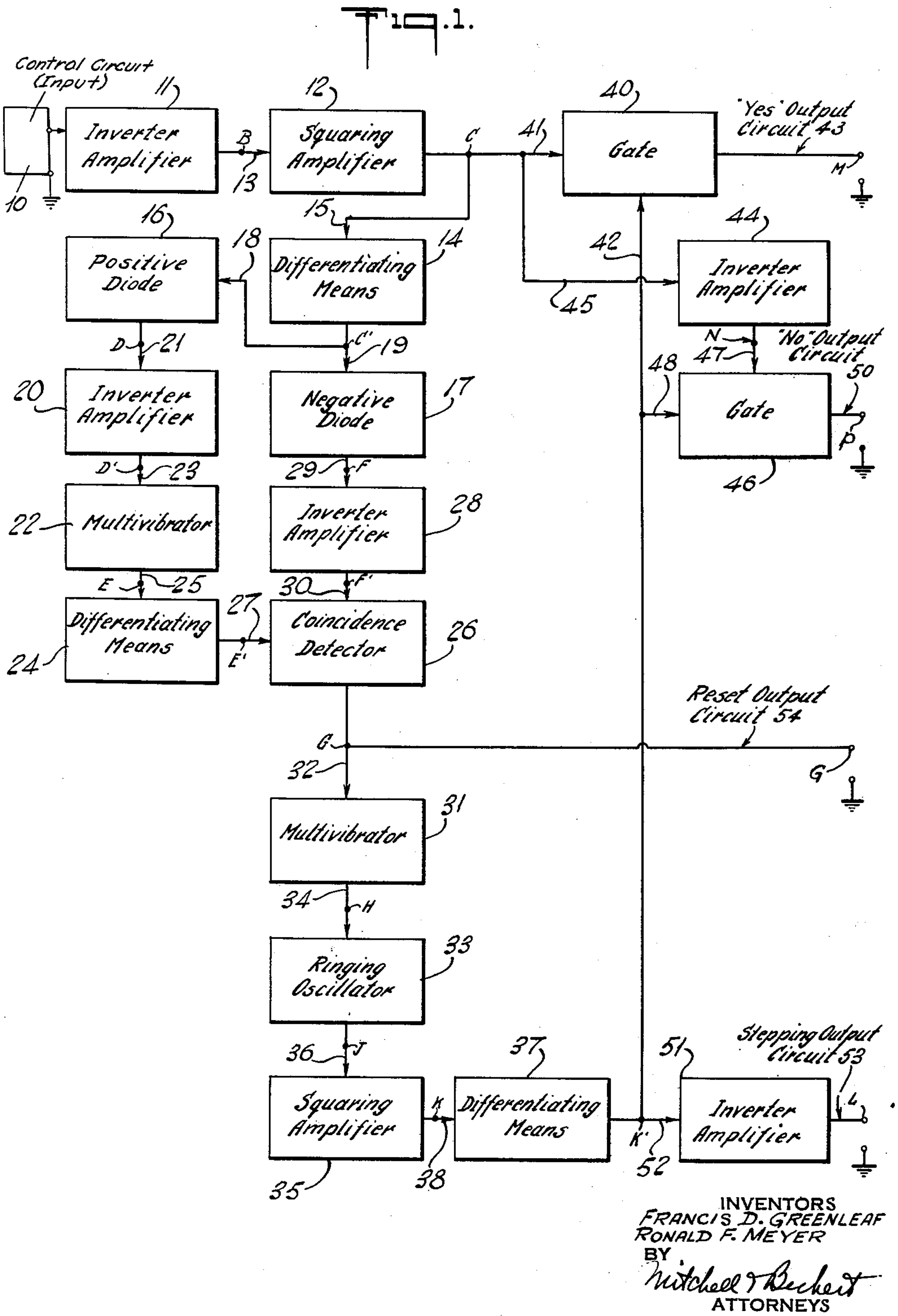

This invention relates to communication systems which transmit information as coded sequences of pulse signals and more particularly to apparatus for separating the coded sequences of pulse signals from other signals in a common communication channel.

Data transmission systems employing the digital repsentation of information are in extensive use in the electronic computer and information handling fields. When the digitally represented data is transferred over a multiplexed communication link, as pulse signals, difficulty is often encountered in identifying the digital data at a receiver. The difficulty arises because it is necessary to distinguish the digitally represented data from modulated carrier signals which are also transmitted over the same channel. The difficulty is aggravated when the limited band width of the communication channel distorts the pulse signals by introducing highf requency attenuations and phase shifts. Such distortion is manifested as a rounding of the leading and trailing edges of the pulse signals. In extreme cases of distortion the pulse signals appear as sinusoids.

It is accordingly a general object of the invention to provide apparatus for separating digitally represented information from a source of a plurality of forms of information.

It is another object of the invention to provide improved digitally represented data separation and identification apparatus which accepts distorted pulse signals representing digital information and rejects signals representing other types of information.

It is a further object of the invention to provide pulse signal detection and selection apparatus which is responsive to digitally represented information.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 1 is a block diagram of electronic apparatus for detecting and separating the pulse signals of digitally represented data in accordance with one embodiment of the invention; and FIG. 2 is a plurality of graphs representing voltage waveforms as a function of time at particular points in the apparatus of FIG. 1.

Briefly, in accordance with the invention apparatus is provided for detecting and selecting digitally represented data. Each item of the data is prefixed by a pulse signal of predetermined width and the units of information within the item are digitally represented by pulse signals of a different width. Means are provided for detecting the prefixing pulse signal and generating a train of gating pulse signals having widths related to the widths of the pulse signals representing the information units within the item. Gating means responsive to the train of gating pulse signals controls the passage of the pulse signals representing the information units to a utilization device.

More particularly, for example, each item of information is represented by a coded combination of digit pulse signals in five time displaced pulse positions. A pulse signal in any position represents a binary one or "yes" and the absence of a pulse signal in any position represents a binary zero or "no." The pulse positions are serially displaced in time with each position being allotted an equal period of time. A pulse signal of a greater width, time duration immediately precedes the first pulse position to indicate that the following time interval contains an item of information.

When the prefixing pulse signal is detected a pulse generator is activated. The pulse generator transmits gating pulse signals, one for each pulse position, to a gating circuit. The gating circuit is activated to pass one pulse signal present in an item position for each pulse signal received from the pulse generator.

Referring to FIG. 1, the apparatus of the invention is illustrated as including a control circuit 10 (the source of pulse signals representing items of digital information) connected to the input side of an inverting amplifier 11 of conventional design. Inverting amplifier 11 is connected via lead 13 to a squaring amplifier 12 for reshaping the incoming signals. Squaring amplifier 12 is connected via lead 15 and to differentiator 14 to a positive diode circuit 16 and a negative diode circuit 17, respectively, by leads 18 and 19. Positive diode circuit 16 is coupled by lead 21 and inverting amplifier 20 to monostable multivibrator 22 via lead 23. A differentiator 24 connects the output of monostable multivibrator 22 via a lead 27 to one input terminal of a coincidence detector 26. The input terminal of coincidence detector 26 is coupled to the negative diode circuit 17 by the leads 29 and 30 and the inverting amplifier 28.

A monostable multivibrator 31 connected by lead 32 to coincidence detector 26 controls the operation of ringing oscillator 33 via lead 34. A squaring amplifier 35, responsive to the ringing oscillator 33, via lead 36 is connected by lead 38 to a differentiator 37. A gate 40 transmits signals received from the squaring amplifier 12, via lead 41, under the control of signals from the differentiator 37 to a "yes" output circuit 43. Similarly, a gate 46 transmits signals received from squaring amplifier 12, via leads 45 and 47 and inverting amplifier 44, under the control of signals received from differentiator 37, via lead 48, to "no" output circuit 50.

An inverting amplifier 51 couples, via lead 52, differentiator 37 to a stepping output circuit 53 for driving a device such as a stepping register. A reset output circuit 54 for periodically starting counting devices, such as stepping registers, can be connected to the output side of the coincidence detector 26.

The operation of the equipment components shown in FIG. 1 will be explained with reference to voltage vs. time diagram of FIGS. 2*b* to 2*s* for an illustrative digitally represented item. FIG. 2*a* shows the waveform of the item represented by a five position (binary digit) coded combination of pulse signals. A prefixing pulse signal indicating the start of the item occupies a time interval from $t_1$ to $t_2$, and the five bit positions occupy the time interval $t_3$ to $t_8$. As represented in FIG. 2*a*, the code reads "yes" for the first binary (bit) digit at $t_3$, "no" for the second binary digit at $t_4$, "yes" for the third binary at $t_5$, "no" for the fourth binary digit at $t_6$, and "no" for the fifth digit at $t_6$. It should be noted that the time duration of the prefixing pulse is longer than the time duration of the pulses in the coded positions. In FIG. 2*b* is shown the wave shape at point B after inversion of the input waveform by the inverting amplifier 11. The inverted waveform, amplified and shaped by the squaring amplifier 12, (FIG. 2*c*) is transmitted from the point C to the differentiator 14 whose output wave form at point C' is shown in FIG. 2*d*. The positive diode circuit 16 removes the negative differentiated spikes (FIG. 2*e*) and transmits the positive spikes from point D to inverting amplifier 20 whose output waveform is shown in FIG. 2*f*.

The monostable multivibrator 22, adjusted by a proper choice of time constants to have a pulse width equal to the prefixing pulse width ($t_1$ to $t_2$), is triggered by the output of inverting amplifier 20, to generate a signal at point E having a waveform as shown in FIG. 2*g*. This signal is differentiated by the differentiator 24 to yield at point E' the signal shown in FIG. 2*h*.

At the same time the negative diode 17 removes the positive spikes from signal at the point C' to present to the inverter amplifier 28 at point F the waveform of FIG. 2*i*. The inverted waveform at point F' (the output of the inverting amplifier 28) is shown in FIG. 2*j*. When the input signals at the points E' and F' are impressed upon the coincidence detector 26, only one time coincidence occurs and a single sharp pulse at time $t_2$ is transmitted from the point G (see 2*k*).

This single pulse triggers monostable multivibrator 31. The monostable multivibrator 31 is adjusted to transmit at point H when triggered, a pulse signal having a width equal to the total digit time interval $t_2$ to $t_8$, as shown in FIG. 2*l*. The ringing oscillator 33 which is gated on by the pulse signal from point H is adjusted to generate a sinusoidal signal having a frequency equal to the repetition rate of the digit pulses, viz., the reciprocal of the ringing oscillator frequency equals a time interval such as the interval between $t_3$ to $t_4$. Thus, under the gating control of monostable multivibrator 31, the output from the ringing oscillator 33 at point J is shown in FIG. 2*m*.

This sinusoidal signal having six cycles is shaped and differentiated. Point K, the output from the squaring amplifier 35 is shown in FIG. 2*n* and the differentiated output at point K' from differentiator 37 is shown in FIG. 2*o*.

Six positive and six associated negative spikes are generated. These signals ("spikes") are transmitted via line 42 to gate 40. Gate 40 which is of the coincidence or "and" type passes a signal when like signals are present at its input terminals. More particularly gate 40 transmits the most negative potential at its input terminals. Therefore only the spikes occurring at $t_3$ and $t_5$ are transmitted. In effect, the spikes at $t_3$ and $t_5$ permitted passage of portions of the pulse signals occurring at times $t_3$ and $t_5$ on the line 41 to the "yes" output circuit 43 (FIG. 2*p*).

Apparatus is further provided for gating the "no" pulse signals to a separate utilization circuit. Basically, the output of the squaring amplifier 12 is inverted by the inverting amplifier 44 as shown by the waveform of FIG. 2*q*. When the waveforms at the points K' and N are gated through gate 46, operating in the same manner as the gate 40, those spikes from the differentiator 37 which occur at times $t_4$, $t_6$ and $t_7$ gate portions of the waveform at the point N to the "no" output circuit as shown in FIG. 2*r*.

In effect, a series of probing pulses from the differentiating means 37 sample, at the gates 40 and 46, pulse signals derived from the original information signals. The probing pulses are timed to occur in synchronism with the binary digit positions of the received item. Thus, whenever a probing signal, a spike on line 42, senses at gate 40 a positive voltage on line 41 a "yes" signal is transferred to "yes" output circuit 43 for the positive potential at that time is indicative of the reception of a "yes" pulse signal. Similarly, whenever a probing signal senses at gate 46 a positive voltage on line 47 a "no" signal is transferred to "no" output circuit 50 for a positive potential at this time, because of the inversion by inverting amplifier 44, is indicative of the reception of a "no" pulse signal.

It should be noted that synchronizing means for an external stepping register are provided. In particular, the differentiating means 37 is connected via line 52 to inverting amplifier 51 which includes clipping means to be generated at point L of the stepping output circuit 53 the waveform shown in FIG. 2*s* for actuating the stepping function in the register. Furthermore, the waveform G in the output circuit 54 can be used to reset the stepping register at the beginning of each coded transmission.

There has thus been shown apparatus for separating digitally represented data from a source of a possible plurality of forms of data. The apparatus provides improved means for selecting digital data in the form of pulse signals regardless of the degree of distortion introduced by communication links.

While the invention has been described in connection with the preferred forms illustrated, it will be understood that modifications can be made within the scope of the invention as defined in the claims which follow.

What is claimed is:

1. A code discriminator comprising a control circuit adapted to receive a train of coded pulses which has a starting pulse of a predetermined width followed by a discrete number of digit pulse intervals at a predetermined repetition rate, a first multivibrator adapted to have a pulse width equal to the width of said starting pulse, means connected to said control circuit and said first multivibrator for triggering said first multivibrator by the leading edges of pulses from the said control circuit, coincidence detection means connected to said multivibrator and to said control circuit for yielding a pulse when the trailing edge of a pulse from the control circuit coincides with the trailing edge of a pulse from the said first multivibrator, a second multivibrator connected to said coincidence detection means and adapted to have a pulse width substantially equal to the total width of said discrete number of digit pulse intervals, means connected to said second multivibrator for generating narrow pulses at said repetition rate during the pulse interval of said second multivibrator, a first gate connected at its input side to said pulse generating means and to said control circuit, a first output circuit connected to said first gate, an inverting amplifier connected at its input side to said control circuit, a second gate connected at its input side to said inverting amplifier and said pulse generating means, and a second output circuit connected to said second gate.

2. A code discriminator as claimed in claim 1 wherein there is provided a squaring amplifier connected at its input side to said control circuit and a differentiator connected at its input side to said squaring amplifier, one input side of said first gate being connected to said squaring amplifier, said inverting amplifier being connected at its input side to said squaring amplifier and said triggering means includes a positive diode circuit connected at its input side to said differentiator, and a second inverting amplifier connected between said positive diode circuit and said first multivibrator.

3. A code discriminator as claimed in claim 2 wherein said coincidence detection means includes a coincidence detector, a second differentiator connected between said first multivibrator and one input side of said coincidence detector, a negative diode circuit connected at its input side to said first differentiator, and a third inverting amplifier connected between said negative diode circuit and the other input side of said coincidence detector.

4. A code discriminator as claimed in claim 3 wherein said pulse generating means includes a ringing oscillator connected at its input side to said second multivibrator, a second squaring amplifier connected at its input side to said ringing oscillator, and a third differentiator connected at its input side to said second squaring amplifier.

5. A code discriminator as claimed in claim 4 wherein there is provided a fourth inverting amplifier connected at its input side to said third differentiator and a stepping output circuit connected to said fourth inverting amplifier.

6. A code discriminator as claimed in claim 5 wherein there is provided a reset output circuit connected to the said coincidence detector.

7. A code discriminator as claimed in claim 6 wherein a fifth inverting amplifier is provided between said control circuit and said first squaring amplifier.

8. A code discriminator comprising a control circuit adapted to receive a train of coded pulses which has a starting pulse of a predetermined width followed by a discrete number of digit pulse intervals at a predetermined repetition rate, means connected to said control circuit for detecting a discrete pulse width equal to the width of said starting pulse, means connected in driven relationship to said detecting means for generating narrow pulses at said repetition rate during a pulse interval coinciding with the total interval of said discrete number of digit pulse intervals, a first gate connected at its input side to said pulse generating means and said control circuit, a first output circuit connected to said first gate, an inverting amplifier connected at its input side to said control circuit, a second gate connected at its input side to said pulse generating means and to said inverting amplifier, and a second output circuit connected to said second gate.

9. Apparatus for selecting an item of digital data transmitted as pulse signals from a data source, said item being represented by a serial combination of a given number of pulse signals each having a first time duration and being prefixed by a pulse signal of a second time duration, comprising a detection means sensitive to the time duration of pulse signals for detecting the prefixing pulse signal, a first pulse signal generator responsive to said detection means for generating a pulse signal having a duration substantially equal to the time duration of said serial combination of pulse signals, a second pulse generator responsive to said first pulse generator for generating a plurality of pulse signals each having a time duration substantially equal to the first time duration, and gating means responsive to said second pulse generator and said data source for transmitting pulse signals representing the item of digital data.

10. Apparatus for selecting an item of digital data transmitted as pulse signals from a data source, said item being represented by a serial combination of a given number of pulse signals each having a first time duration and being prefixed by a pulse signal of a second time duration comprising a detection means sensitive to the time duration of pulse signals for detecting the prefixing pulse signal, a pulse generator responsive to said detection means for generating a plurality of pulse signals each having a time duration substantially equal to the first time duration and gating means responsive to said pulse generator and said data source for transmitting pulse signals representing the item of digital data.

References Cited in the file of this patent

UNITED STATES PATENTS

| | | |
|---|---|---|
| 2,537,991 | Grieg | Jan. 16, 1951 |
| 2,577,827 | Tompkins | Dec. 11, 1951 |
| 2,665,410 | Burbeck | Jan. 5, 1954 |
| 2,665,411 | Frady | Jan. 5, 1954 |
| 2,759,998 | Labin et al. | Aug. 21, 1956 |